Feb. 27, 1923.
E. A. RIOTTE.
SAFETY DEVICE FOR REFRIGERATING MACHINES.
FILED JUNE 14, 1920.
1,446,585.
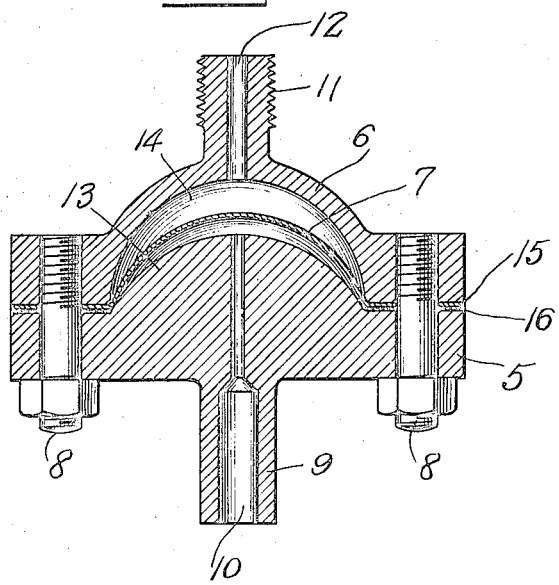
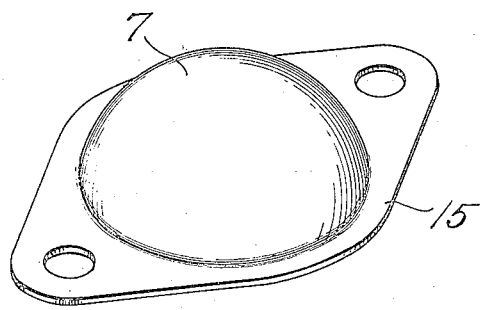
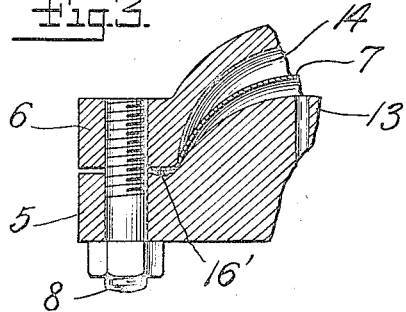
Inventor
E. A. Riotte
By his Attorneys Patented Feb. 27, 1923.

1,446,585

UNITED STATES PATENT OFFICE.

EUGENE A. RIOTTE, OF MANHASSET, NEW YORK.

SAFETY DEVICE FOR REFRIGERATING MACHINES.

Application filed June 14, 1920. Serial No. 388,722.

*To all whom it may concern:*

Be it known that I, EUGENE A. RIOTTE, a citizen of the United States of America, residing at Manhasset, New York, have invented a new and useful Safety Device for Refrigerating Machines, of which the following is a specification.

My invention relates particularly to a device intended for use with a machine of the intermittent absorption type, using ammonia as the refrigerant.

It has been proposed to employ a safety device or valve in connection with the still or other part of the apparatus which may be subjected to pressure, which device or valve includes a frangible disc. I have found that such discs must conform accurately to the proper design and standard of the apparatus in order to be certain that it will function at any time under the proper circumstances. To insure this, it is essential that the disc shall be of uniform and standard pattern especially designed for the machine. To make sure that such a standard disc is employed, I specially construct a casing and disc so that while it is possible to remove the old disc, it is impossible to replace it with an ordinary flat disc, and so that a specially formed disc conforming generally to the standard must be employed.

Fig. 1 is a vertical section of one form of device embodying the improvements of my invention.

Fig. 2 is a perspective view of the specially formed disc.

Fig. 3 is a fragmentary section showing a slight modification.

The casing consists of the two parts 5 and 6, which hold between them the frangible diaphragm or disc 7. The parts of the casing may be secured together conveniently, as for instance, by series of bolts 8. The part 5 of the casing is preferably provided with a stem or extension 9 having a passage 10 adapted to be connected to the generator or still, or such other part of the apparatus which it is desired to protect. Another part of the casing is provided with an extension 11 having a passage 12 through which the gas is adapted to be led off to some point for absorption or dissipation. One part of the casing is provided with a specially formed boss 13, and the other part with a recess 14. The diaphragm or disc is shaped generally to correspond with the boss 13. Preferably it is substantially hemi-spherical. The margin or rim 15 of the disc is clamped between the edges of the parts of the casing. Preferably a gasket 16 is employed to insure a gas-tight joint. The margin of the disc may be designed to receive the bolts 8 as shown in Figs. 1 and 2, or it may be shaped as shown in Fig. 3. The gasket 16' may be seated in a shallow groove to make a better joint with a minimum quantity of material.

In operation, if the gas pressure in the passage 10 beneath the disc or diaphragm 7 exceeds a certain limit, the disc will break and the gas will be allowed to escape through the passage 12. It will be readily understood that it is desirable that the breaking point of the disc corresponds with the requirements of the machine or apparatus, and if it were possible to substitute for the disc any ordinary piece of metal, the breaking point would be likely to be so high that the apparatus would blow up before the disc would burst. Such a condition would make the machine too dangerous for ordinary use. I have found that a thin disc of silver or other metal having similar properties of uniformity and permanency when pressed or shaped hemi-spherically is reliable and satisfactory for this purpose.

These discs need be for ordinary purposes very thin, that is, only a few thousandths of an inch thick. It will be obvious from inspection that where one form of the casing has a boss 13, it will be impossible to use an ordinary flat disc. The owner is therefore obliged to procure from the manufacturer or his agent a proper standard disc or diaphragm which will have the proper breaking strength or breaking point. Although I have shown the disc as hemi-spherical and the boss 13 substantially corresponding in shape, it should be understood that I do not consider the invention limited in its broader aspect to this special shape, nor to the special material mentioned.

I claim:

1. A safety device of the character described comprising a casing and a frangible disc, the parts being so shaped that it is impossible to substitute a flat disc.

2. A safety device of the character described comprising a casing having a raised boss and a frangible disc having a correspondingly shaped boss.

3. A safety device of the character described comprising a casing having a raised boss and a frangible disc having a hemispherical boss superposed on said raised boss.

4. A safety device of the character described comprising a casing having a raised boss and a precious metal disc having a boss fitting said raised boss.

5. A safety device of the character described comprising a casing having a raised boss and a frangible disc having a correspondingly shaped boss, and a gasket for the rim of said disc.

6. A safety device of the character described comprising a casing having a boss and a silver disc fitting over said boss.

7. A safety device comprising a base having a raised boss with a gas passage, a companion member, a frangible member extending over said boss and bolts for clamping said parts together.

8. A safety device comprising two parts, one having an inlet and the other having an outlet, a frangible member mounted between said parts and means for preventing the insertion of a flat disc between said parts.

EUGENE A. RIOTTE.